March 1, 1966   A. D. PARONE ET AL   3,237,488
DRILL
Filed Oct. 4, 1963   2 Sheets-Sheet 1

INVENTORS
Anthony D. Parone
John F. McAuliffe
BY Rockwell and DeLio
ATTORNEYS

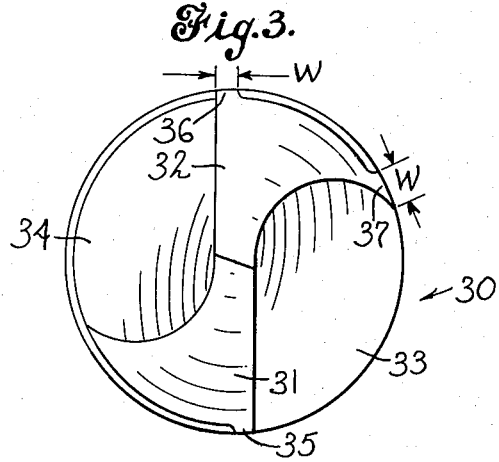
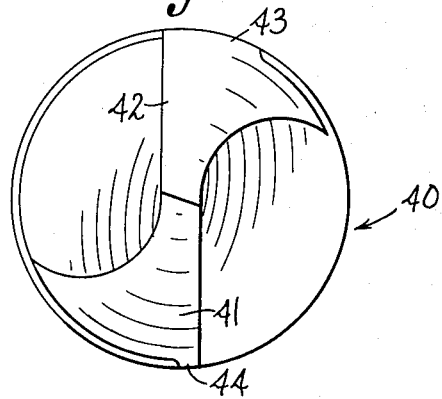
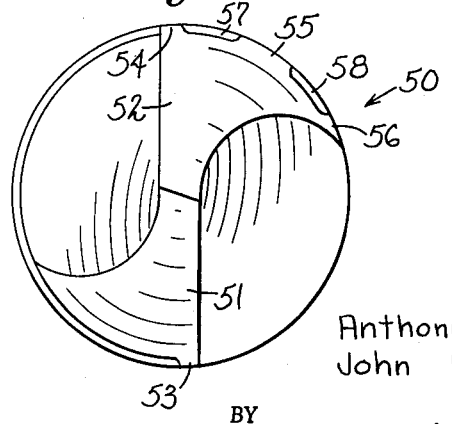

United States Patent Office

3,237,488
Patented Mar. 1, 1966

3,237,488
DRILL
Anthony D. Parone, Elmwood, and John F. McAuliffe, Farmington, Conn., assignors to Pratt & Whitney Inc., West Hartford, Conn.
Filed Oct. 4, 1963, Ser. No. 313,916
8 Claims. (Cl. 77—70)

This invention relates to drills, and more particularly relates to twist drills.

Twist drills are normally formed with a plurality of flutes defined by lands therebetween. The lands are the peripheral portion of the drill body between adjacent flutes. In metal cutting drills, particularly those designed to operate on ferrous metals, the lands are relieved behind a leading marginal portion so as to provide a body diameter clearance behind the margins. This clearance is provided in order that the entire surface or face of the land will not rub against the walls of the hole being drilled. If the lands define sections of a cylindrical surface, there is undue contact between the lands and the walls of the hole being drilled, which would cause the drill to heat up and bind.

It has long been conventional practice to form drills with lands having margins thereon so that the drills are symmetrically formed with respect to the axis of the drill. In fact, drill manufacturers have expended great efforts to maintain low tolerances in manufacturing drills so that the flutes and lands of twist drills are symmetrical, to prevent out-of-round cutting.

The primary reason for relieving the lands of a drill to provide a clearance behind a margin, is to minimize the area of contact between the lands of the drill and the walls of the hole being drilled. This decrease in the area of contact will tend to decrease abrasion of the drill and prolong useful tool life. While the provision of the margins on the lands contributes to tool life eventually the margins will be worn down so that a land of almost cylindrical section results, at which time the drill will have a tendency to heat up and bind on the walls of the workpiece.

In some instances, drills are made with lands which define a portion of a cylinder and have no margin, which lands are symmetrical about the drill axis. These drills are often referred to as stove drills. Their application is usually limited to nonferrous metals and they are seldom made over ¼" in diameter. In view of the large contact areas of the land with a workpiece, these drills are not suitable for drilling many ferrous metals, since they will heat up and bind in the hole being drilled.

In contrast to the conventional type drills outlined above, which are symmetrical about the drill axis, the present invention provides a drill which is unsymmetrically formed about the axis thereof. As hereinafter described, we have found that a drill having a degree of imbalance about its axis has a tendency to deflect during drilling, which deflection minimizes contact between the lands and the walls of the workpiece, thereby greatly prolonging useful tool life.

Accordingly, it is an object of this invention to provide a new and improved twist drill.

Another object of this invention is to provide a new and improved twist drill having increased tool life.

Another object of this invention is to provide a new and improved drill having increased tool life especially in drilling semi-ductile and relatively non-ductile materials.

A further object of this invention is to provide a new and improved drill wherein the lands thereof are unsymmetrical with respect to the axis of the drill and such dissymmetry increases the useful life of the drill.

The novel features of the invention are pointed out with particularity and distinctly claimed in the concluding portion of this specification. However, the invention both as to its organization, and together with further objects and advantages thereof, may best be appreciated by reference to the following detailed description taken in conjunction with the drawings wherein;

FIGS. 3, 4 and 5 illustrate end views, similar to FIG. 2 of drills made in accordance with other embodiments of the invention.

Figure 1:
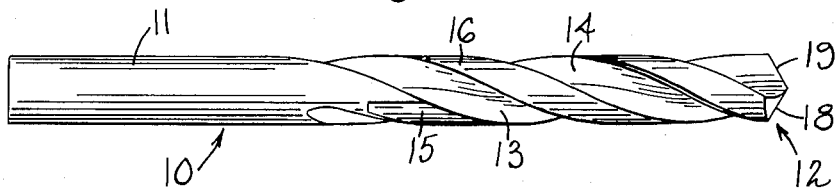
FIG. 1 is a side elevation of a drill embodying the invention.

A drill embodying the invention comprises an elongated body generally indicated by the reference numeral 10 having a shank portion 11 and a cutting portion or tip 12. The drill body, as illustrated, has two-flutes 13 and 14 defined by lands 15 and 16.

In accordance with a preferred embodiment of the invention only one land, land 15 is provided with body diameter clearance B leaving a margin 17. It will be seen that with this arrangement the cutting lips 18 and 19 are equal as in conventional drills and extend from the periphery of the drill lands to the web portion 20 and meet at the chisel edge 21.

At the cutting tip the drill may be sharpened in a conventional manner with the surfaces 22 and 23, following lips 18 and 19, respectively, receding from the leading edges of the cutting lips and the lands to provide the usual relief for cutting action by the lips.

A drill embodying the invention, having a margin with body diameter clearance B therebehind on one land, results in an unbalanced drill which will deflect slightly in operation. When the subject drill is being used the uncleared land supports most of the loading on the drill while the cleared land supports less of the loading. This differential loading of the lands of the drill leads to a slight deflection of the drill and hence the drill will cut slightly oversized holes for its rated size. The deflection of the drill, which results in the drill cutting a slightly larger hole, actually makes only a slight increase in the size of the hole over a conventional drill. For example, a hole cut with the subject drill may be .002" to .0025" oversize on drill sizes of .125" to .500". However, it is understood of course that most conventional drills cut a slightly larger hole than their rated size, however, not as large as the example just given. The deflection of the drill and the tendency of the drill to cut a slightly larger hole results in a decrease in the tendency of the drill to abrade on the walls of the hole. The result is that the instant drill does not heat up and bind as much as conventional drills.

A drill embodying the invention may be manufactured in the same manner as a conventional drill, that is by providing the flutes thereon, but then providing a margin 17 and body diameter clearance B on one land only. The other land is left uncleared, except as hereinafter set forth. The results of comparative tests between drills embodying the instant invention and conventional drills show a surprising and quite unexpected increase in useful tool life with respect to number of holes drilled, especially in the less ductile materials.

Figure 2:
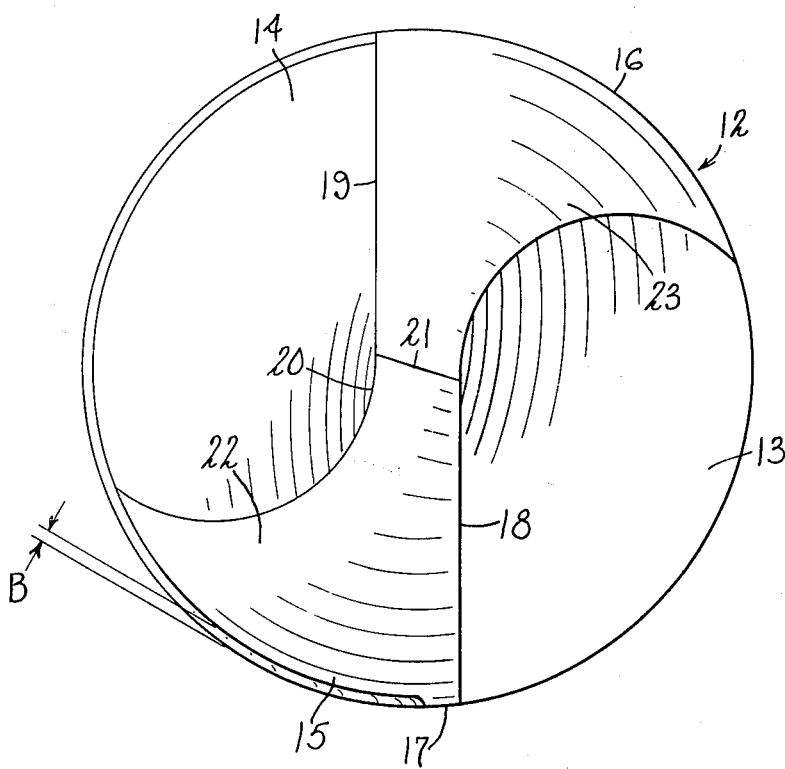
FIG. 2 is an enlarged view of the drill tip of FIG. 1.

In conducting comparative life tests a drill embodying the invention was compared with conventional, commercially available, two-fluted twist drills having each land provided with equal margins and clearance therebehind. The tests were run on materials and selected metals which may be described as relatively hard or of lesser ductility than so-called mild steels. The conventional drills, designated here as drill I, were general purpose jobbers' drills manufactured by Pratt & Whitney Company, Inc., West Hartford, Connecticut, and identifiable as "Blue Helix," List 617. The composition of these drills was high speed steel M-1 as classified by the American Society for Metals. The drills were heat treated in accordance with standard practice. Drills constructed in accordance with the invention, designated as drill II, were identical to the conventional drills described above, except that only one land was provided with a margin and body diameter clearance therebehind, as illustrated in FIGS. 1 and 2.

The results of these life tests are tabulated below:

Test I

Material: A-2 chrome-molybdenum air hardening die steel; hardness: Rockwell C 35; thickness 1 inch
Drill speed: 585 revolutions per minute (r.p.m.); 38 surface feet per minute (s.f.m.)
Feed: .005″/revolution (rev.)
Drill size: ¼″

| Drill: | Number of holes |
| --- | --- |
| I | 182 |
| II | [1] 533 |

[1] Test stopped before failure.

Test II

Material: Same as Test I
Drill speed: 885 r.p.m., 55 s.f.m.
Feed: .005″/rev.
Drill size: ¼″

| Drill: | Number of holes |
| --- | --- |
| I | 31 |
| II | 95 |

Test III

Material: Same as Test I
Drill speed: 465 r.p.m., 50 s.f.m.
Feed: .005″/rev.
Drill size: 13/32″

| Drill: | Number of holes |
| --- | --- |
| I | 148 |
| II | [1] 448 |

[1] Test stopped before failure.

Test IV

Material: A.I.S.I. 3250 steel, ⅜″ thick
Drill speed: 60 s.f.m., 1800 r.p.m.
Feed: .004″/rev.
Drill size: ⅛″

| Drill: | Number of holes |
| --- | --- |
| I | 11 |
| II | 207 |

Test V

Material: Same as Test IV, 1¼″ thick
Drill speed: 60 s.f.m., 900 r.p.m.
Feed: .004″/rev.
Drill size: 17/64″

| Drill: | Number of holes |
| --- | --- |
| I | 36 |
| II | 66 |

Test VI

Material: 302 stainless steel, 1¼″ thick
Drill speed: 50 s.f.m., 720 r.p.m.
Feed: .004″/rev.
Drill size: 17/64″

| Drill | Number of holes |
| --- | --- |
| I | 76 |
| II | 100 |

Test VII

Material: Cast iron (grey); hardness: Rockwell B96; thickness ½″
Drill speed: 1200 rev./min. 100 s.f.m.
Feed: .004″/rev.
Coolant: None
Drill size: 5/16″

| Drill: | Number of holes |
| --- | --- |
| I | 4,500 |
| II | 10,068 |

In carrying out the tests all drills were operated under the same conditions until they fractured or produced holes which obviously could not be considered acceptable under any circumstances. These tests were primarily concerned with drill life, and since the end of life point with drills is often debatable, no attempt was made to draw fine lines as to when a hole was acceptable or unacceptable. By the time most drills had fractured, overheated, or were stopped for other reasons, the last holes produced were quite poor in quality with respect to roundness, uniformity of diameter and surface finish.

Prior to test drilling, all drills of both types were inspected with respect to each other to determine that comparative drills were equivalent in dimensions, in various physical characteristics such as, included angle, lip relief chisel angle, web diameter, outside diameter, lip height, web centering and point centering.

To further determine the comparative life of drills embodying the invention in heat-treated steels and brittle materials, comparative life tests were conducted between drills I and II and drills of three other manufacturers, designated III, IV and V. These latter drills are commercially competitive with drill I.

The results of these tests are tabulated as follows:

Test VIII

Material: 6AL-4V titanium; hardness: Rockwell C 29; thickness: 1 inch
Drill speed: 300 r.p.m., 25 s.f.m.
Feed: 0.004″/rev.
Coolant: Sulphurized oil
Drill size: 5/16″

| Drill: | Average number of holes (3 drills) |
| --- | --- |
| I | 14.7 |
| II | 24 |
| III | 9 |
| IV | 9 |
| V | 11 |

Test IX

Material: A.I.S.I. 4340 steel; hardness: Rockwell C 40–42; thickness: 1 inch
Drill speed: 160 r.p.m., 20 s.f.m.
Feed .005″/rev.
Coolant: Sulphurized oil
Drill size: ½″

| Drill: | Average number of holes (3 drills) |
| --- | --- |
| I | 44 |
| II | 124 |
| III | [1] 48 |
| IV | 52 |
| V | 54 |

[1] 5 drills.

Test X

Material: L-605; hardness: Rockwell B 96; thickness: 1 inch
Drill speed: 150 r.p.m., 12.5 s.f.m.
Feed: .002″/rev.
Coolant: Sulphurized oil
Drill size: 5/16″

| Drill: | Average number of holes (3 drills) |
| --- | --- |
| I | 4 |
| II | 8.6 |
| III | [1] 8.5 |
| IV | 2.3 |
| V | 15 |

[1] 4 drills.

These life tests have demonstrated that drills made in accordance with the invention enjoy a substantial advantage in tool life over equivalent drills in the harder and less ductile materials. This is evident from the test results on the high hardness 4340 steel, the 6AL–4V titanium alloy, and cast iron, with its very low ductility.

Further tests have shown that there is no significant effect on the size of holes produced with type II drills whether or not a guide bushing is utilized.

An inspection of holes produced with type II drills revealed that: the holes were just as round as those produced by a good conventional two-flute drill; the uniformity of diameter of the holes produced by type II drills were slightly better; and the surface finish of the base defining the holes produced by type II drills were, in general, of a better finish.

Drills embodying the invention have also shown superior results when used to drill objects formed of cured plastic materials, which objects were quite tough. Normally drills manufactured for drilling objects made from plastic materials are called "low helix" drills, meaning the drill flutes have less angular change per unit of length. This type of drill is often referred to as a "plastic drill." Conventional drills, including those designed to drill plastic, will create burrs at the entrance and exit of holes drilled in objects formed from plastics. This can be very detrimental where the object is formed of laminations, because the drill and the burrs caused thereby will tend to delaminate the object.

Drills embodying the invention used to drill holes in NEMA Grade XX phenolic-paper resin laminates 1" thick have shown little if any tendency to burr the material, and have exhibited increased tool life. The phenolic-paper laminate mentioned above is used extensively as mounting panels for electric circuit components, such as relays, switchgear, etc.

Drills embodying the invention may also be formed with an even plurality of flutes greater than two wherein the lands of one type would be adjacent. For example, in a four-fluted drill the uncleared lands would be adjacent each other and not restricted between the lands having margins defined thereon.

As has been previously mentioned, the superior tool life of drills embodying the invention is believed to be due to the imbalance in the lands. This imbalance causes the drill to deflect slightly and cut slight oversize holes, resulting in a decrease in the tendency of the drill to abrade on the walls of the hole.

In larger size drills of about one inch or more, the degree of imbalance between the unsymmetrical lands may tend to create a hole larger than desired. It is therefore within the scope of the invention to control the degree of imbalance between the lands by shaping the drills as shown in FIGS. 3, 4, 5.

In FIG. 3, drill 30 is provided with lands 31 and 32 defined by flutes 33 and 34. Land 31 is shaped in the conventional manner so as to provide a normal margin 35 with body diameter clearance therebehind. Land 32 has a normal margin 36 thereon, and is also provided with a trailing margin 37 to provide the desired degree of imbalance between lands 31 and 32. It will be understood that the width W of margins 36 and 37 may be varied to create the desired degree of imbalance.

FIG. 4 illustrates a drill 40 having lands 41 and 42 where the desired degree of imbalance is achieved by making margin 43 on land 42 substantially greater than the normal margin 44 on land 41.

FIG. 5 illustrates a drill 50 having lands 51 and 52 wherein land 51 is provided with a normal margin 53.

The desired degree of imbalance is achieved by defining three margins 54, 55 and 56 on land 52. The margins 54, 55 and 56 may be defined by removing metal from the spaces 57 and 58.

It will thus be seen that the objects set forth above, among those made apparent from the preceding description, are efficiently attained and since changes may occur to those skilled in the art in practicing the invention and in the construction set forth without departing from the scope of the invention, it is intended that all matter contained in the above description and shown in the accompanying drawing shall be interpreted as illustrative and not in a limited sense.

What is claimed is:

1. A drill comprising, a body portion having two flutes defining lands therebetween, one of said lands being provided with a margin and body diameter clearance therebehind, the other of said lands having no clearance.

2. A twist drill comprising, a drill body having a shank portion and a fluted portion having two flutes defining lands therebetween, one of said lands defining a section of a cylindrical surface, the face of the other of said lands being provided with a margin and body diameter clearance therebehind.

3. In a twist drill having two flutes defining lands therebetween, the drill having cutting lips extending from a chisel edge to the periphery of the drill, the cutting lips being substantially equal, the improvement comprising; one of the lands being provided with a margin and body diameter clearance therebehind and the other of the lands having no clearance.

4. A drill comprising, a body portion having an even plurality of flutes defining lands therebetween, one-half of said lands being provided with a margin and body diameter clearance therebehind, the other of said lands being without clearance, the lands of one type being adjacent.

5. A twist drill comprising, a body portion having helical flutes defining angularly spaced lands therebetween, one of said lands being provided with a margin and body diameter clearance therebehind, the other of said lands being without clearance.

6. A drill comprising, a body portion having an even plurality of flutes defining lands therebetween, one-half of said lands being provided with a margin and body diameter clearance therebehind, the other of said lands being without clearance.

7. A drill comprising, a body portion having two flutes defining lands therebetween, one of said lands being provided with a margin and body diameter clearance therebehind, the other of said lands having a plurality of margins to provide a desired degree of imbalance between said lands when the drill is operated.

8. A drill comprising, a body portion having two flutes defining lands therebetween, each of said lands being provided with a margin and body diameter clearance therebehind, one margin on one of said lands being wider than the margin on the other of said lands to produce a desired degree of imbalance between said lands when the drill is operated.

No references cited.

WILLIAM W. DYER, Jr., *Primary Examiner.*

FRANCIS S. HUSAR, *Assistant Examiner.*